United States Patent [19]
Senese

[11] 3,781,823
[45] Dec. 25, 1973

[54] COMPUTER CONTROL UNIT CAPABLE OF DYNAMICALLY REINTERPRETING INSTRUCTIONS

[75] Inventor: Daniel John Senese, Freehold, N.J.

[73] Assignee: Bell Telephone Laboratories, Incorporated, Murray Hill, N.J.

[22] Filed: July 28, 1972

[21] Appl. No.: 276,116

[52] U.S. Cl. .......... 340/172.5
[51] Int. Cl. .......... G06f 1/00
[58] Field of Search .......... 340/172.5

[56] References Cited

UNITED STATES PATENTS

| | | | |
|---|---|---|---|
| 3,374,466 | 3/1968 | Hanf | 340/172.5 |
| 3,302,183 | 1/1967 | Bennett | 340/172.5 |
| 3,560,933 | 2/1971 | Schwartz | 340/172.5 |
| 3,268,871 | 8/1966 | Handler | 340/172.5 |
| 3,325,788 | 6/1967 | Hackl | 340/172.5 |
| 3,544,969 | 12/1970 | Rakoczi | 340/172.5 |
| 3,614,740 | 10/1971 | Delagi | 340/172.5 |

*Primary Examiner*—Raulfe B. Zache
*Attorney*—W. L. Keefauver et al.

[57] ABSTRACT

A microprogrammed computer is disclosed in which two sets of microprograms, each set containing a microprogram to execute each program instruction, are stored in microprogram memory. A selected program instruction is provided which, when executed, changes the set of microprograms from which particular microprograms are selected to execute subsequent program instructions. Insofar as the microprograms comprising the newly selected set of microprograms differ, in general, from the corresponding microprograms comprising the previously selected set, the execution characteristics of subsequent program instructions executed by microprograms in the newly selected set are changed.

5 Claims, 5 Drawing Figures

FIG. 4A

| LOCATION ADDRESS | | MICROPROGRAM MEMORY CONTENTS | | |
|---|---|---|---|---|
| MEMORY SEGMENT CODE | MEMORY SEGMENT LOCATION CODE | MICROINSTRUCTION FIELD | MEMORY SEGMENT FIELD | MEMORY SEGMENT LOCATION FIELD |
| $S_1$ | $SL_1$ | $MI_1$ | $S_2$ | $SL_3$ |
| ⋮ | | | | |
| $S_1$ | $SL_N$ | $MI_0$ | $S_{j+1}$ | - |
| $S_2$ | $SL_1$ | - | | |
| $S_2$ | $SL_2$ | - | | |
| $S_2$ | $SL_3$ | $MI_5$ | $S_3$ | $SL_7$ |
| ⋮ | | | | |
| $S_3$ | $SL_7$ | $MI_2$ | $S_3$ | $SL_8$ |
| $S_3$ | $SL_8$ | $MI_0$ | $S_1$ | - |
| ⋮ | | | | |
| $S_j$ | $SL_1$ | | | |
| ⋮ | | | | |
| $S_j$ | $SL_N$ | | | |

FIG. 4B

| LOCATION ADDRESS | | MICROPROGRAM MEMORY CONTENTS | | |
|---|---|---|---|---|
| MEMORY SEGMENT CODE | MEMORY SEGMENT LOCATION CODE | MICROINSTRUCTION FIELD | MEMORY SEGMENT FIELD | MEMORY SEGMENT LOCATION FIELD |
| $S_{j+1}$ | $SL_1$ | $MI_1$ | $S_{j+2}$ | $SL_3$ |
| ⋮ | | | | |
| $S_{j+1}$ | $SL_N$ | $MI_0$ | $S_1$ | - |
| ⋮ | | | | |
| $S_{j+2}$ | $SL_3$ | $MI_5$ | $S_{j+3}$ | $SL_8$ |
| ⋮ | | | | |
| $S_{j+3}$ | $SL_8$ | $MI_0$ | $S_{j+1}$ | - |
| ⋮ | | | | |
| $S_M$ | $SL_1$ | | | |
| ⋮ | | | | |
| $S_M$ | $SL_N$ | | | |

COMPUTER CONTROL UNIT CAPABLE OF DYNAMICALLY REINTERPRETING INSTRUCTIONS

BACKGROUND OF THE INVENTION

1. Field of the Invention

This invention relates to the field of digital computer control units and, more specifically, to digital computer control units of the microprogrammed type.

2. Description of the Prior Art

In a digital computer having a microprogrammed control unit, hereafter referred to as a microprogrammed computer, the first step in executing a particular program instruction is the determination of which microprogram is to be used for that program instruction. As used herein, the phrase "program instruction" refers to an instruction in a language at the lowest level of complexity normally used for programming, typically referred to as object or assembly language. Following the determination of the correct microprogram, the first microinstruction in the microprogram is executed. Thereafter, each microinstruction in the microprogram is executed in the appropriate order until all such microinstructions have been executed. All of the operations performed in the execution of all of the microinstructions in the microprogram constitute the execution characteristics of the program instruction. Absent some means for varying the microinstructions comprising the microprogram for a program instruction, the execution characteristics of a program instruction are always the same.

Some methods have been developed for altering the execution characteristics of program instructions by altering the microinstructions executed as part of the respective microprograms. In the application of these methods the execution characteristics of program instructions are generally altered by selectively setting the states of memory devices affecting the determination of which microinstruction in the microprogram is to be executed next. For example, a conditional branch within a microprogram may be effected during execution of the microprogram by combining selected address data contained within one microinstruction with data contained in selected memory devices, the states of which have been preset, to determine the address of the next microinstruction to be executed. The result of the conditional branch is the selection of one of a plurality of microinstructions for execution. While such methods are useful in many applications, they can be cumbersome and possibly inefficient when the execution characteristics of most or all of the program instructions are to be altered. This is particularly true if the alteration is of a general nature and is a common alteration for all program instructions. One such common alteration would be the removal of all checking operations from the execution of all program instructions in order to speed execution.

SUMMARY OF THE INVENTION

In a control unit according to applicant's invention, the execution characteristics of all program instructions may be altered by the execution of a single program instruction. More specifically, according to applicant's invention, two sets of microprograms are stored in selected portions of microprogram memory. Each set contains one microprogram for executing each program instruction in the set of program instructions. A program instruction is provided which, when executed, modifies a microinstruction selection address code used in determining from which of the two sets of microprograms the microprograms for executing program instructions are to be taken. The altering of this address code changes the set of microprograms from which the microprograms to execute subsequent program instructions are selected. As a result, the execution characteristics of program instructions executed subsequently are determined by the microprograms in the newly selected set of microprograms.

It is an object of applicant's invention to provide a digital computer capable of changing the execution characteristics of its program instructions.

It is another object of applicant's invention to provide a digital computer control unit responsive to a selected program instruction which, when executed, modifies the selection of microprograms determining the execution characteristics of all subsequent program instructions.

It is yet another object of applicant's invention to provide a digital computer control unit responsive to the execution of a selected program instruction to change a selection code determining the set of microprograms from which the microprograms to execute subsequent program instructions are selected.

DESCRIPTION OF THE DRAWING

FIGS. 4A and 4B are representations of example microprograms stored in microprogram memory.

DETAILED DESCRIPTION OF THE ILLUSTRATIVE EMBODIMENT

Figure 1:
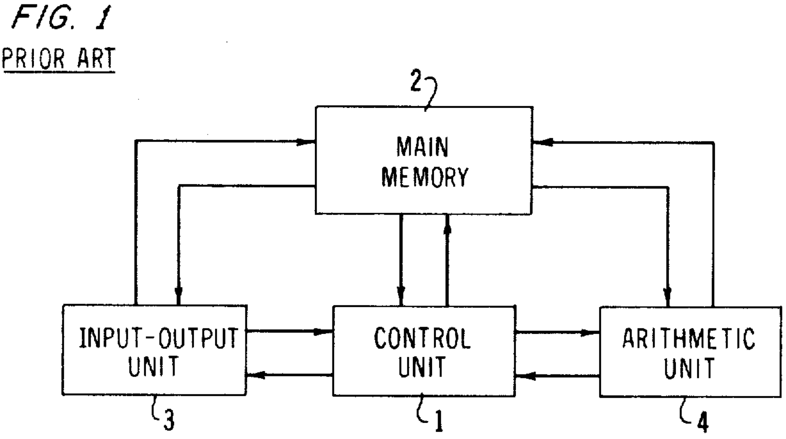
FIG. 1 PRIOR ART
FIG. 1 shows a block diagram of a computer.

As was indicated above, applicant's invention is directed at an improvement in microprogrammed computers. To fully appreciate the operation of applicant's invention it is first necessary to understand in general the function of a control unit in a digital computer. A representation in block diagram form of a general digital computer is shown in FIG. 1. Many variations of this basic structure are possible. However, the structure shown in FIG. 1 is adequate to represent the general functions of a control unit. Specifically, the control unit 1 accepts and interprets instructions stored in the main memory 2. Pursuant to those instructions, the control unit 1 controls the operations of the other units of the computer while directing the flow of information between those units. More specifically, control unit 1, in response to program instructions transmitted to the control unit 1 from the main memory 2, sequences the operations and information flow between and, to some extent, within the arithmetic unit 4, the main memory 2, and the input-output unit 3. Insofar as the function of the control unit is to control the flow of information and the occurrence of operations within the computer, the control signals from the control unit occur in a sequence. In a microprogrammed control unit the proper sequencing of control signals is obtained by executing predetermined sequences of microinstructions, each one of which directs or in some way affects the information in the computer and the flow of that information within and between the elements of the computer.

It is useful here to clarify the meaning of a microinstruction as opposed to a program instruction. It should be observed that a program instruction is generally of the type used by a programmer in specifying the algorithms he wishes the computer to perform. The programmer is generally unconcerned with the specifics of how the computer performs each step, such as addition or multiplication, in the algorithm. Thus, a program instruction is considered the lowest level instruction with which a programmer is concerned. A microinstruction, however, is simpler in most instances than a program instruction. In fact, the execution of a program instruction generally requires a plurality of microinstructions. A microinstruction, for example, may gate the contents of a register in the arithmetic unit on to a data bus. Thereafter, another microinstruction may gate the information from the data bus into another register in the arithmetic unit or in another unit of the computer. Microinstructions can be considered to control microoperations which are, in general, of little or no concern to the programmer.

Figure 2:
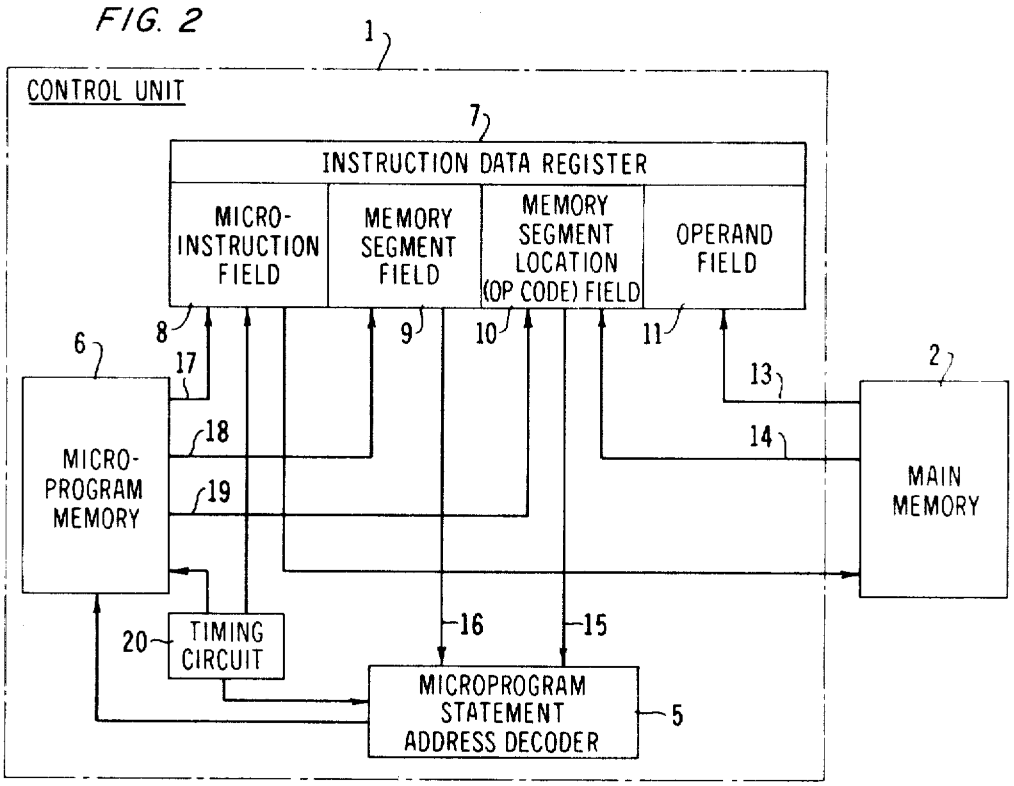
FIG. 2 shows a block diagram of the control unit and main memory shown in FIG. 1.

Referring now specifically to applicant's invention, the control unit 1 of FIG. 1 is expanded in FIG. 2 and several of its pertinent major components are shown therein in block diagram form. It should first be noted that an MPM, microprogram memory, 6 is shown in FIG. 2 as contained in control unit 1. The MPM 6 stores the microprogram used to execute each of the program instructions. The output, to be described shortly, of the MPM 6 on the lines 17, 18, and 19 is supplied to selected fields in the IDR, instruction data register, 7. It should be noted that the program instructions comprising the output of the main memory 2 on the lines 13 and 14 are also supplied to selected fields of the IDR 7. Thus, the IDR 7 not only receives the output from the MPM 6, containing microinstructions, but it also receives program instructions from the main memory 2. The significance of the dual function of the IDR 7 will be seen in the discussion which follows.

Figure 3:
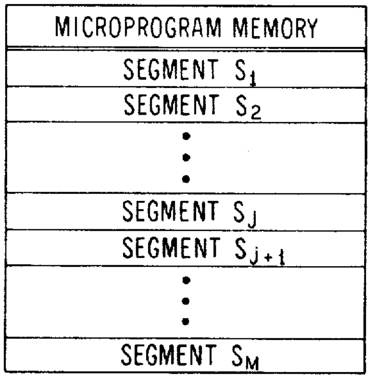
FIG. 3 shows a representation of the segmentation of microprogram memory.

Returning to the discussion of the MPM, microprogram memory, 6 (FIG. 2), it can be seen in FIG. 3 that it is divided into M segments. Each of these segments contains N locations. The address for a unique location in the microprogram memory, therefore, consists of two portions, the first being a segment code specifying in which segment of the MPM the location appears and the second being a segment location code specifying which location within the particular segment is the desired location. The use of these two codes will also be developed further below.

Each location in the MPM, microprogram memory, 6 (FIG. 3) stores what shall be referred to as a microprogram statement. This is to be distinguished from a microinstruction since a particular microprogram statement includes not only a microinstruction but also the address of the next microprogram statement in the microprogram in which both microprogram statements are contained. The address of the next microprogram statement includes a memory segment code and a memory segment location code. It should be noted that, as the preceding discussion suggests, microprograms are stored in the MPM 6 in a linked list structure which is well known in the prior art.

The structure of a microprogram statement just described is reflected in the fields of the IDR, instruction data register, 7 (FIG. 2) to which the outputs of the MPM, microprogram memory, 6 are supplied. Specifically, the microinstruction contained in a microprogram statement is supplied on the line 17 to the microinstruction field 8 of the IDR 7. In addition, the output of the MPM 6, consisting of the memroy segment code for the address of the next microprogram statement, is supplied on the line 18 to the memory segment field 9 of the IDR 7. Finally, the output of the MPM 6, consisting of the memory segment location code for the address of the next microprogram statement, is supplied on the line 19 to the memory segment location field 10 of the IDR 7. It should be noted that the fields 9 and 10 (FIG. 2) comprise what can be considered a next address field whose contents specify the address of the next microprogram statement in the current microprogram.

Having discussed the linked list structure of microprograms stored in the MPM 6 (FIG. 2) and the outputs of the MPM 6 to the IDR 7, attention is turned to the outputs of the main memory 2 and their effect on the IDR 7. In FIG. 2 it can be seen that the output of the main memory 2 on line 14 is supplied to the memory segment location field 10 of the instruction data register 7. The output from the main memory 2 on the line 14 is the operation code, or OP code, for the program instruction to be executed. Thus, when a program instruction is loaded from main memory into the IDR 7, the OP code of that instruction is loaded in the memory segment location field 10. The remaining portion of the program instruction, more specifically, the operand, is loaded by means of the line 13 into the operand field 11.

It was previously mentioned that the memory segment field 9 (FIG. 2) and the memory segment location field 10 of the IDR, instruction data register, 7, are to be considered the next address field of the IDR 7. The outputs of those two fields on the lines 16 and 15, respectively, are supplied to the MSAD, microprogram statement address decoder, 5. When a new address, consisting of the contents of the fields 9 and 10 (FIG. 2) of the IDR 7, is supplied to the MSAD 5, the address is decoded and the appropriate microprogram statement stored in the microprogram memory 6 is accessed to be supplied at the appropriate time to the IDR 7. Timing of operations within the control unit 1 is controlled by the timing circuit 20.

Having now described generally the structure of the control unit 1 (FIG. 2) and its relationship to the main memory 2, attention is turned to discussion of the function of this control unit 1 in relation to applicant's invention. It will be recalled that an object of applicant's invention is to provide a microprogrammed computer which can change the execution characteristics of its program instructions. Pursuant to this objective the MPM, microprogram memory, 6 contains two complete sets of microprograms, each set containing one microprogram for each program instruction. Referring to FIG. 3 the first set of microprograms is stored in the memory segments indicated by memory segment codes $S_1$ through $S_J$. The second set of microprograms is stored in the segments with memory segment codes $S_{J+1}$ through $S_M$. Furthermore, the first microprogram statement in each microprogram in the first set of microprograms is stored in the segment corresponding to segment code $S_1$ at the location corresponding to the OP code of the program instruction associated with that microprogram. More specifically, the OP code of each program instruction specifies the segment location code for the first microprogram statement in the microprogram to execute that program instruction. In the case of microprograms contained in the first set of microprograms, that first microprogram statement is stored in the segment corresponding to segment code $S_1$. Similarly, for microprograms contained in the second set of microprograms, the first microprogram statement is stored in the location corresponding to the OP code of the appropriate program instruction in the segment corresponding to the memroy segment code $S_{j+1}$.

It was previously mentioned that the contents of the next address field in the IDR, instruction data register, 7 (FIG. 2) consisting of the memroy segment field 9 and the memory segment location field 10, specify the address of the next microprogram statement to be read from microprogram memory 6 into the IDR 7. To execute a microprogram for a program instruction, however, it is first necessary to obtain the address of the first microprogram statement in the microprogram for that program instruction. As was noted above, the first microprogram statement of each microprogram in the first set of microprograms appears in the location corresponding to the OP code of the program instruction in the memory segment corresponding to the segment code $S_1$. Therefore, if the memory segment field 9 (FIG. 2) of the IDR 7 contains the code $S_1$, the loading of the OP code of the program instruction to be executed into the memory segment location field 10 completes the address of the first microprogramstatement in the appropriate microprogram in the first set of microprograms. As a result, the MSAD, microprogram statement address decoder, 5 decodes that first address and accesses microprogram memory 6 resulting in the loading of the appropriate microprogram statement into the fields 8, (FIG. 2), 9, and 10 of the IDR 7. It should be noted, however, that if the memory segment field 9 (FIG. 2) contains the memory segment code $S_{j+1}$, the address decoded by the MSAD 5 when the program instruction is loaded from main memory 2 into the IDR, instruction data register, 7 is the address of the first microprogram statement in the appropriate microprogram contained in the second set of microprograms. As a result, changing the segment code in the field 9 prior to decoding the first microprogram statement address for a program instruction has the affect of changing the microprogram selected to execute that program instruction. Therefore, it is the code stored in the memory segment field 9 (FIG. 2) which is affected by the previously mentioned program instruction for changing the execution characteristics of subsequent program instructions.

To fully illustrate the operation of the control unit 1 in conjunction with what will be called the "change characteristics" program instruction, an example illustrating the effects of the change characteristics program instruction on another instruction will be discussed below. It is assumed for this example that the OP code for the change characteristics program instruction is $SL_N$ and the OP code for the example program instruction is $SL_1$. It is further assumed that the field 9 (FIG. 2) of the IDR 7 contains the segment code $S_1$ when the main memory 2 loads the example program instruction having OP code $SL_1$ and operand $OPER_1$ into the fields 10 and 11, respectively. Insofar as the segment code $S_1$ and the segment location code $SL_1$, the OP code of the program instruction, together constitute a valid address, the MSAD 5 (FIG. 2) decodes that address and accesses the appropriate microprogram statement. The statement accessed is included in the representation of microprogram memory shown in FIG. 4A. As can be seen therein, the statement stored at the address corresponding to the segment code $S_1$ and segment location code $SL_1$, referred to as address $S_1$, $SL_1$, contains the microinstruction $MI_1$, the segment code $S_2$ and the segment location code $SL_3$. This statement is loaded into instruction data register 7 (FIG. 2) with the microinstruction $MI_1$ being loaded into the field 8, the memory segment code $S_2$ being loaded into the field 9, and the memory segment location code $SL_3$ being loaded into the field 10.

Since the valid microinstruction $MI_1$ has been loaded into the microinstruction field 8 (FIG. 2) of the IDR 7, that microinstruction is executed. Following its execution the MSAD, microprogram statement address decoder, 5 decodes the contents of the fields 9 and 10, consisting of the codes $S_2$ and $SL_3$, respectively, to determine the address of the next microprogram statement in the current microprogram. When the codes in the fields 9 and 10 (FIG. 2) are decoded, the microprogram statement corresponding to the address, referred to as $S_2$, $SL_3$, is accessed and loaded into the IDR 7. Referring to FIG. 4A, it can be seen that the microprogram statement corresponding to the address $S_2$, $SL_3$ contains the microinstruction $MI_5$, The memory segment code $S_3$, and the memory segment location code $SL_7$. As illustrated above, when this microprogram statement is loaded into the IDR 7 (FIG. 2), the microinstruction $MI_5$ is executed, whereupon the MSAD 5 decodes the address $S_3$, $SL_7$ and accesses the appropriate microprogram statement. When the microprogram statement corresponding to the address $S_3$, $SL_7$ is thereafter loaded into the IDR 7 (FIG. 2), the microinstruction $MI_2$ (FIG. 4A) is loaded into the microinstruction field 8 (FIG. 2) and is executed. In addition, the segment code $S_3$ (FIG. 4A) is loaded into the memory segment field 9 (FIG. 2), and the segment location code $SL_8$ (FIG. 4A) is loaded into the memory segment location field 10 (FIG. 2).

After the microinstruction $MI_2$ is executed, the microprogram statement corresponding to the address $S_3$, $SL_8$ is accessed by the MSAD 5 and is loaded into the IDR, instruction data register, 7 (FIG. 2). In this case, however, referring to FIG. 4A, it can be seen that the microprogram statement stored in the location having the address $S_3$, $SL_8$ contains the microinstruction $MI_0$. The microinstruction $MI_0$ is the command to load a new program instruction from main memory 2 (FIG. 2) into the fields 10 and 11 of the IDR 7. As it would be expected, this indicates the completion of the execution of the current microprogram. In fact, the final microprogram statement in every microprogram contains the microinstruction $MI_0$.

Insofar as the microprogram statement stored in location having the address $S_3$, $SL_8$ (FIG. 4A) is the last microprogram statement in the microprogram for executing the current program instruction, it is of interest to note that the statement contains a memory segment code even though there is no additional microprogram statement in the microprogram. Specifically, as can be seen in FIG. 4A, the memory segment field of the microprogram statement contained in the location having the address $S_3$, $SL_8$ contains the code $S_1$. Thus, when the microprogram statement is loaded into the IDR 7

(FIG. 2), the memory segment field 9 is loaded with the code $S_1$. As a result, the next program instruction loaded into the fields 10 and 11 of the IDR 7 will be executed using the appropriate microprogram in the first set of microprograms. More specifically, it will be recalled that the presence of the code $S_1$ in the field 9 at the time a program instruction is loaded into the IDR 7 results in the location of the first microprogram statement being contained in the memory segment corresponding to the segment code $S_1$. This necessarily implies that the microprogram to be used to execute the new program instruction is contained within the first set of microprograms.

It has been seen above that when a program instruction which is not the change characteristics program instruction is executed using a microprogram in the first set of microprograms, the field 9 (FIG. 2) contains the code $S_1$ at the completion of the execution of that microprogram. Since the field 9 contains the code $S_1$, the next program instruction executed will also be executed by a microprogram in the first set.

It is now of interest to consider the results if the change characteristics program instruction is executed next. The OP code for this program instruction is assumed to be $SL_N$. When this OP code is loaded into the field 10 (FIG. 2) by the main memory 2, the MSAD 5 decodes the contents of the fields 9 and 10, specifically, the codes $S_1$ and $SL_N$, respectively, and accesses the corresponding microprogram statement in the microprogram memory (FIG. 4A). As can be seen in FIG. 4A the microinstruction for the microprogram statement stored at address $S_1$, $SL_N$ is the microinstruction $MI_0$. It has already been seen that this is the microinstruction which commands the loading of a new program instruction into the IDR, construction data register, 7 (FIG. 2). MOreover, it indicates the termination of the microprogram for the current program instruction which, in this case, is the change characteristics instruction. Therefore, the single microprogram statement stored at address $S_1$, $SL_N$ (FIG. 4A) comprises the entire microprogram for the change characteristics instruction in the first set of microprograms.

There is, however, an additional point to note about the microprogram statement stored at address $S_1$, $SL_N$ (FIG. 4A). As mentioned earlier, a microprogram contained in the first set of microprograms for executing a program instruction which is not the change characteristics program instruction has in its final microprogram statement not only the microinstruction $MI_0$ but also the memory segment code $S_1$. This is not the case, however, when the program instruction is the change characteristics program instruction. Referring to FIG. 4A, it can be seen that the microprogram statement stored at address $S_1$, $SL_N$ contains in its memory segment field the code $S_{j+1}$. As a result, when, in the execution of the change characteristics program instruction, this microprogram statement is loaded into the IDR 7 (FIG. 2), the memory segment field 9 is loaded with the code $S_{j+1}$. As a further result, when the next program instruction is loaded into the instruction data register 7 from the main memory 2 pursuant to the microinstruction $MI_0$, the location of the first microprogram statement in the microprogram for executing the new program instruction is contained in the memory segment corresponding to the code $S_{j+1}$. It will be recalled that all microprogram statements appearing in that memory segment are the beginning microprogram statements for microprograms in the second set of microprograms. Thus, the microprogram used to execute the next program instruction will be contained in the second set of microprograms.

To fully illustrate the effect of having executed the change characteristics program instruction, the execution at this point of the example program instruction having the OP code $SL_1$ will be discussed. It will be recalled that this is the same program instruction which was discussed prior to the execution of the change characteristics program instruction.

Having loaded the OP code $SL_1$ into the memory segment field 10 (FIG. 2) from main memory 2, the MSAD 5 decodes the contents of the fields 9 and 10, specifically, codes $S_{j+1}$ and $SL_1$, respectively, and accesses the appropriate microprogram statement shown in FIG. 4B. As can be seen therein the microprogram statement stored at address $S_{j+1}$, $SL_1$ contains the microinstruction $MI_1$, the memory segment code $S_{j+2}$, and the memory segment location code $SL_3$. This microprogram statement is loaded into the IDR 7 (FIG. 2), and the microinstruction $MI_1$ is executed. Thereafter, the MSAD 5 decodes the address $S_{j+2}$, $SL_3$ and accesses the corresponding microprogram statement. It can be seen in FIG. 4B that the microprogram statement for the address $S_{j+2}$, $SL_3$ contains the microinstruction $MI_5$, the memory segment code $S_{j+3}$, and the memory segment location code $SL_8$. Again, following the loading of this microprogram statement into the IDR 7 (FIG. 2), the microinstruction $MI_5$ is executed and the next address is decoded. In this case, the next address $S_{j+3}$, $SL_8$ (FIG. 4B) contains the microinstruction $MI_0$ and the segment code $S_{j+1}$. As has been seen before, the microinstruction $MI_0$ indicates that this is the final microprogram statement in the microprogram. It should, however, be noted that the segment code which is contained in the microprogram statement and which is loaded into memory segment field 9 (FIG. 2) of the IDR 7 is the code $S_{j+1}$. Thus, the address of the first microprogram statement in the microprogram to execute the next program instruction loaded into the instruction data register 7 will be contained in the memory segment corresponding to the segment code $S_{j+1}$. As seen before, this necessarily implies that the next program instruction will also be executed by a microprogram in the second set of microprograms. It should be noted here that the segment code contained in the final microprogram statement of every microprogram in the second set of microprograms except the microprogram for the change characteristics instruction is the segment code $S_{j+1}$.

It has been seen above that when the program instruction having the OP code $SL_1$ is executed by a microprogram contained in the first set of microprograms the sequence of microinstructions executed is the following: $MI_1$, $MI_5$, $MI_2$, and $MI_0$. After having executed the "change characteristics" program instruction, however, the same program instruction having the OP code $SL_1$ is executed by a microprogram contained in the second set of microprograms. In that case the sequence of microinstructions executed is the following: $MI_1$, $MI_5$, and $MI_0$. It is readily apparent that the microinstruction $MI_2$ is eliminated in the execution of the program instruction having the OP code $SL_1$ using the microprogram in the second set of microprograms. Thus, in this situation, it would be expected that the program instruction is executed faster when executed by the microprogram in the second set of microprograms.

It should also be noted that the above discussion has described the function of the change characteristics program instruction with respect to changing from the first set of microprograms to the second set of microprograms. The process may easily be reversed, however, merely by executing another change characteristics program instruction. Specifically, it will be recalled that when the program instruction having the OP code $SL_1$ was last executed, the memory segment code $S_{J+1}$ was loaded into the memory segment field 9 (FIG. 2) along with the microinstruction $MI_0$ in the field 8. Thus, if the change characteristics program instruction, having the OP code $SL_N$, is loaded next into the instruction data register 7 (FIG. 2), the MSAD 5 accesses the location $S_{J+1}$, $SL_N$. It can be seen in FIG. 4B that this location contains the microinstruction $MI_0$, requiring the loading of the next program instruction, and the segment code $S_1$. As a result of the loading of the segment code $S_1$ into the memory segment field 9 (FIG. 2) of the IDR 7, the next program instruction loaded into the IDR 7 will be executed by a microprogram contained in the first set of microprograms since the location of the first microprogram statement will be contained in the memory segment corresponding to the code $S_1$.

The above discussion has disclosed a microprogrammed computer in which the execution characteristics of program instructions can be changed by executing a selected program instruction. In view of the discussion above many variations in implementation of applicant's invention, within the spirit and scope of applicant's invention, will become clear to those skilled in the art.

What is claimed is:

1. In a digital computer, the combination comprising:

a microprogram memory comprising a plurality of storage locations for storing a corresponding plurality of microprogram statements, each storage location comprising means for storing any one of a plurality of memory segment codes, each memory segment code uniquely identifying a plurality of said storage locations;

selection means, connected to said microprogram memory, for generating signals for accessing the microprogram statement stored in any selected storage location;

a register connected to said microprogram memory and comprising means for storing the memory segment code comprising the microprogram statement last accessed by said selection means;

a program memory for storing program instructions, each comprising any one of a plurality of operation codes;

wherein said register is further connected to said program memory and further comprises means for storing any one of said operation codes, the operation code stored identifying a corresponding storage location of the plurality of storage locations identified by the memory segment code stored in said register;

wherein said selection means is connected to said register; and wherein said selection means responds to the memory segment code and the operation code stored in said register to generate signals defining the storage location storing the microprogram statement to be accessed.

2. In a digital computer responsive to programs comprising any one or more of a set of program instructions and a selected program instruction, the combination comprising:

a memory means, comprising storage locations, for storing a first and a second set of microprograms, each of said sets comprising a microprogram corresponding to each of said program instructions, each microprogram consisting of one or more microprogram statements, each microprogram statement comprising any one of a plurality of memory segment codes, each memory segment code uniquely identifying a group of said storage locations;

wherein for each program instruction of said set of program instructions the memory segment code comprising the final microprogram statement in the corresponding microprogram of said first set of microprograms is a first memory segment code;

wherein for said selected program instruction the memory segment code comprising the final microprogram statement in the corresponding microprogram of said first set of microprograms is a second memory segment code;

wherein for each program instruction of said set of program instructions the memory segment code comprising the final microprogram statement in the corresponding microprogram of said second set of microprograms is said second memory segment code;

wherein for said selected program instruction the memory segment code comprising the final microprogram statement in the corresponding microprogram of said second set of microprograms is a third memory segment code;

selection means, connected to said memory means, for generating signals for selecting the microprogram statement stored in any one of said storage locations; and storage means connected to said memory means for storing in a first field the memory segment code comprising the microprogram statement last selected by said selection means.

3. The combination of claim 2 wherein said third memory segment code is identical to said second memory segment code.

4. The combination of claim 3 wherein said selection means is further connected to said storage means and is responsive to the memory segment code stored in said first field for generating said signals.

5. The combination of claim 4 further comprising:

program memory for storing said programs;

wherein each of said program instructions comprising said programs comprises any one of a plurality of operation codes;

wherein said storage means is further connected to said program memory for storing in a second field any one of said operation codes; and wherein said selection means connected to said storage means is further responsive to the operation code sotred in said second field for generating said signals.

* * * * *